July 14, 1959 R. W. COOK ET AL 2,894,539
PIPE SEALING APPARATUS AND METHOD
Filed Dec. 6, 1954 4 Sheets-Sheet 1

INVENTORS.
ROBERT W. COOK
LEE F. MCBRIDE
BY
Lockwood, Galt, Woodard, & Smith
ATTORNEYS

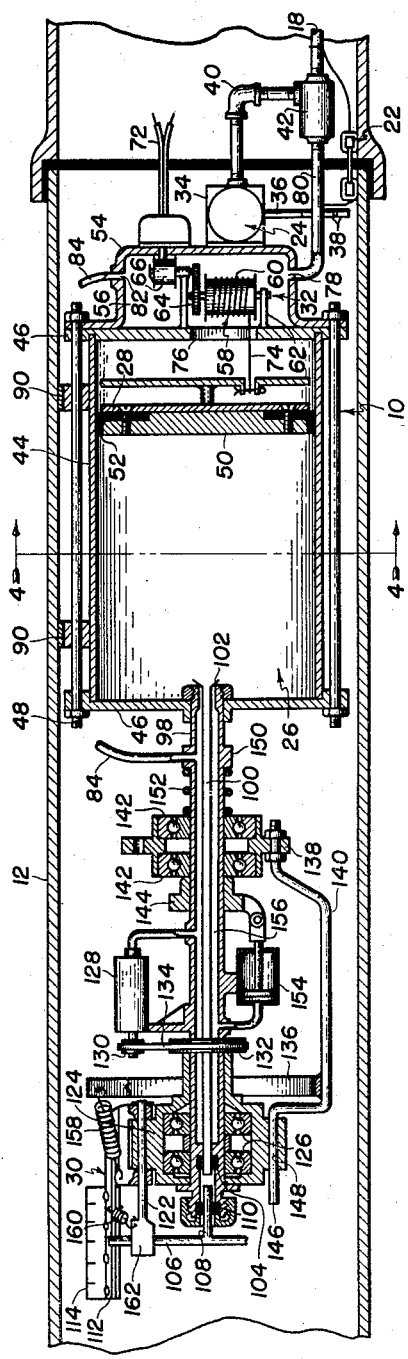
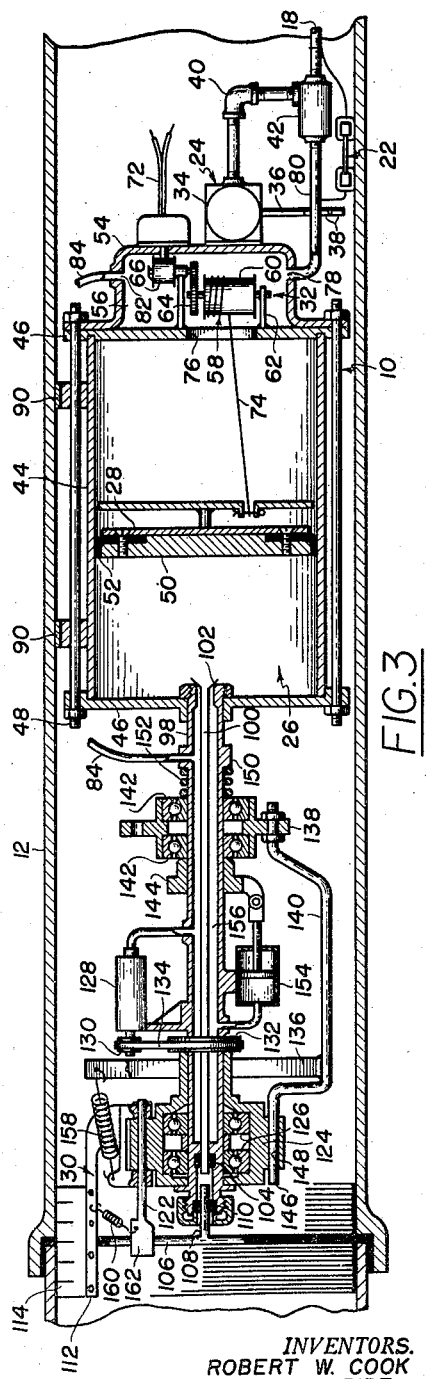

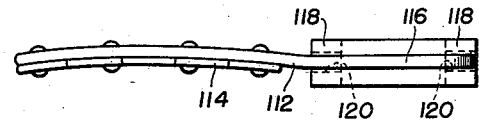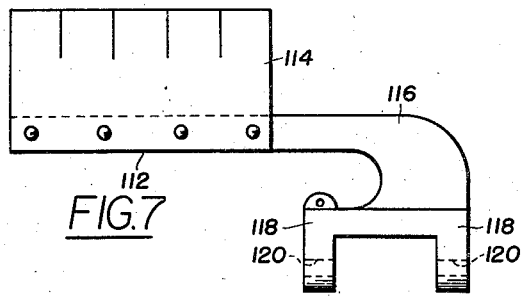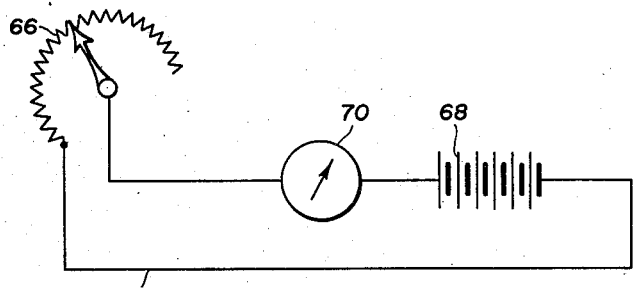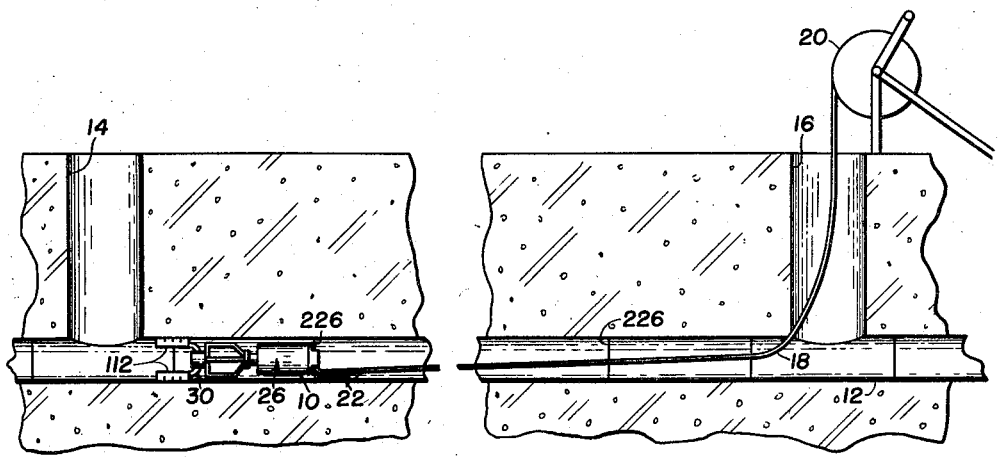

July 14, 1959 R. W. COOK ET AL 2,894,539
PIPE SEALING APPARATUS AND METHOD
Filed Dec. 6, 1954 4 Sheets-Sheet 4

INVENTORS.
ROBERT W. COOK
LEE F. MCBRIDE
BY
Lockwood, Galt, Woodard, & Smith
ATTORNEYS

United States Patent Office 2,894,539
Patented July 14, 1959

2,894,539

PIPE SEALING APPARATUS AND METHOD

Robert W. Cook and Lee McBride, Decatur, Ind., assignors to Anthony Wayne Improvement Company, Fort Wayne, Ind.

Application December 6, 1954, Serial No. 473,402

15 Claims. (Cl. 138—97)

This invention relates generally to a pipe sealing apparatus and method, and more specifically to a device for repairing pipes, which device operates interiorly thereof.

When many of the presently used gas mains were originally laid, the estimated future usage for these mains was much lower than that which has actually developed. As a result, these mains are being used with ever-increasing gas pressures in an attempt to meet service requirements. The higher main pressures have produced numerous leaks. In certain instances, flaws and fissures in the mains at the joints (and other locations), which would not be too serious at lower pressures, develop excessive leaks at higher main pressures.

The problem is how may these gas mains be adequately sealed in an economical and reliable manner so that the renovated main can withstand higher pressures and hence keep pace with demands of present day usage. The invention proposes a means as to how this can be done.

Heretofore, the gas main to be repaired was located underground and a series of expensive excavations were made to the subterranean level of the main. The junctures or joints joining the lengths of pipe would be sealed from the exterior thereof. The cost, inaccuracy, time, inconvenience, etc. of such a method has led to abandonment of this procedure in favor of the present invention.

The invention has among its objects:

Providing a pipe sealing mechanism which functions interiorly of a pipe and by either intermittent or continuous operation;

Eliminating necessity for sinking a large number of holes to repair subterranean conduits;

Locating and sealing pipe leaks by a process wherein operation is controllable remotely from the pipe which is being sealed;

Automatically detecting flaws in a pipe which are prone to leakage, and metering predetermined quantities of sealing material which is spread over the inner surface of the pipe to repair the flaw; and sequentially locating pipe joints and covering the joints with a sealing material;

Other objects and features of the invention will become apparent from a consideration of the following description, taken in connection with the accompanying drawings wherein:

Fig. 2 is a sectional view taken on the line 2—2 of Fig. 1, the mechanism being in a flaw or joint-detecting position and with the applicators retracted;

Fig. 3 is a sectional view identical to Fig. 2 but the mechanism is shown advanced to a sealing position in relation to a detected joint, and the applicators are protracted;

Fig. 5 is a schematic showing how the mechanism is used in practice;

Figs. 6 and 7 are enlarged detail views of the blade portion of the applicator;

Fig. 8 is an equivalent electrical circuit used in determining the quantity of sealing material used for sealing a joint or circumferential flaw in the pipe;

Figure 1:
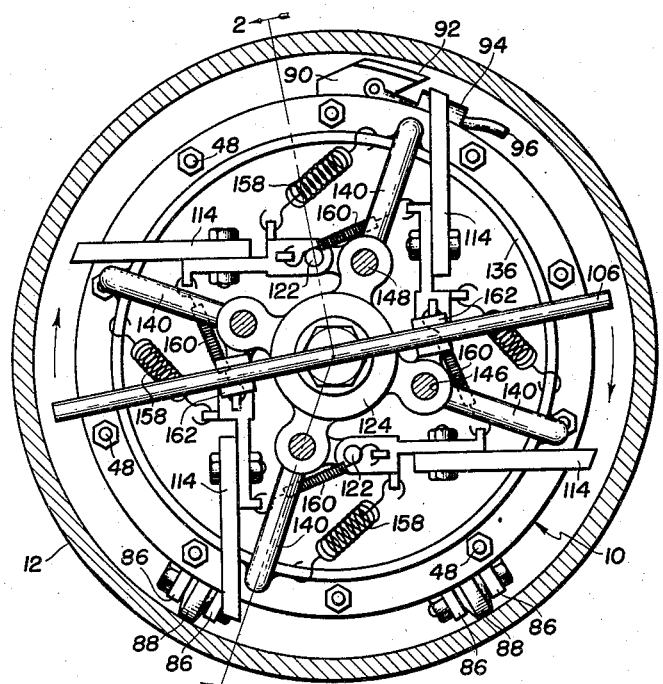
Fig. 1 is an end view of the pipe sealing mechanism viewed from the "applicator" or trailing end thereof.

The pipe sealing mechanism is designated generally by reference numeral 10 in the drawings. The pipe sealing mechanism is positioned within an underground main 12, two holes or excavations 14 and 16 being made for obtaining ingress and egress for the pipe sealing mechanism to and from the main 12. The holes or excavations 14 and 16 may be spaced apart any preferred distance, two hundred (200) to three hundred (300) feet being typical distances which have been used. No intermediate openings in the main are required as will become clear from a complete description of the invention. A combination air and electric line 18 is connected to the pipe sealing mechanism. This line can be force-fed from the excavation 16 through the main toward the opening 14. The line 18 is then connected to the mechanism 10; a spool 20 is used to wind the line 18 so that the mechanism 10 may be advanced through the main 12 toward the excavation 16.

The pipe sealing mechanism 10 comprises the following subassemblies: a joint-locating device 22, a means 24 for conditioning the detected joint, a sealing agent storage 26 with cooperative extruding elements 28 which meter determinable quantities of sealing agent from storage, an applicator 30 for spreading sealing agent over the detected joint, and a power system 32 for operating the applicator 30 and extruding elements 28.

Each of these subassemblies will be separately considered; their interrelation will then become apparent from a consideration of the operation of the device.

The joint-locating device 22 consists chiefly of two (2) spaced inductors which detect joints and circumferential flaws, fissures, cracks and the like in the wall of the pipe by sensing variations in electromagnetic force because of a change in reluctance of the pipe. The construction and operation of this device is fully developed in co-pending application Serial No. 394,003, filed November 24, 1953, and insofar as necessary the disclosure of said co-pending application is made a part hereof. The joint locating device 22 is disclosed herein for the purpose of showing its use in combination with a pipe sealing mechanism and for fully explaining the method of this invention. It is to be understood that the joint-locating device is sufficiently sensitive to detect joints and the like at any location in the pipe. That is, fissures which resemble joints and which are detectible are not limited to the joints between lengths of pipes; all fissures which are prone by their size to leakage are detectible by the joint-locating device, and each of these different kinds and locations of flaws are detected and then sealed, as is explained hereinafter.

This joint-locating or flaw-detecting device 22 is illustrated in detail in Figs. 9, 10, 11 and 12. This device is composed of primary and secondary electromagnetic assemblies or inductors 210 and 212, each inductor consisting of a laminated iron core 214 and a suitable coil 216. As seen more clearly in Fig. 11, the opposite ends of the cores 214 project beyond the respective coils 216. A rigid frame of some non-ferrous material, such as bronze, is composed of two bar members 218 which are suitably secured at the opposite ends to the two cores 214, respectively. By means of these bar members 218, the inductors 210 and 212 are secured in rigid assembly spaced apart a proper distance to provide mutual magnetic coupling therebetween.

Figure 10:
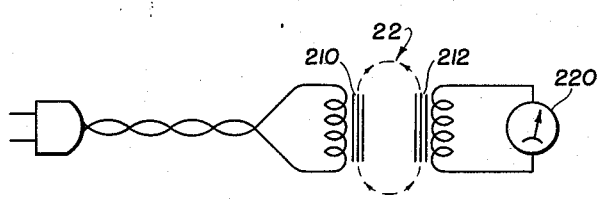
Fig. 10 is an equivalent circuit diagram thereof.

As illustrated diagrammatically in Fig. 10, the inductors 210 and 212 are positioned such that the magnetic lines of force produced by the primary inductor 210 may be caused to pass through or to link inductor 212 for inducing a voltage in the latter. An ordinary voltage-indicating meter 220 may be used to measure the voltage induced in the secondary inductor 212.

Figure 11:
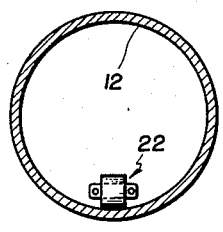
Fig. 11 is a cross-sectional view taken of the joint-locating device positioned in a typical gas main which is made of cast iron.
Figure 12:
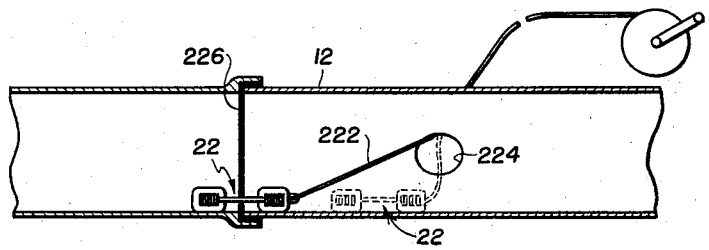
Fig. 12 is an axial sectional view of the joint-locating device inside a typical gas main, the device being in a position for locating the illustrated joint.

In operation, the device 22 is placed on the bottom of a typical gas main as illustrated in Figs. 11 and 12, and is slowly drawn through the conduit by means of a suitable cord or cable 222. Suitable power, such as 110-volts A.C., is fed to the primary inductor 210 which serves to produce magnetic flux which passes from the primary core tips into the iron pipe. Some of this magnetism passes axially through the pipe and enters the inductor 212 thereby inducing a voltage which may be measured by the meter 220. Still another path is provided circumferentially of the pipe so as to be confined essentially to only the primary core 210. With the device 22 positioned as shown in the dashed lines in Fig. 12, immediately after introduction into the main opening 224, the voltage induced in the secondary inductor 212 is observed and recorded. The device 22 is next slowly moved forwardly through the main 12 until such time as the indicated voltage on the meter 220 drops. This drop in voltage indicates the location of a joint and will occur when the device 22 is situated as illustrated by the full line drawing of Fig. 12.

The reason for this sudden drop in voltage is attributed to the increased value of reluctance to the passage of flux axially of the pipe which occurs at the joint 226. By reason of this increased reluctance, less flux is available for inducing a voltage in the secondary inductor 212, and no force or energy will be present to cause the same degree of axial flow as obtained during the time the device 22 is not straddling a joint. Instead, the circumferential path through the pipe 12, offering a lower reluctance path, will serve to shunt the flux away from the axial path through the joint 226, thereby insuring reduced axial flow and positive indication of the joint location.

The spacing between the inductors 210 and 212 is critical. If the spacing is too close, the device becomes insensitive to the location of a pipe joint. If the spacing is too great, the device also becomes insensitive by reason of the high reluctance path. Furthermore, improved sensitivity is achieved by the device 22 lying on its side as illustrated in Figs. 11 and 12, this feature being especially significant in the fact that this invention may be used to detect joints in almost any size of pipe.

While the device 22 has been explained in connection with locating the joint 226 in a typical gas main 12, it will of course be understood that the device will detect the location of any type of crack or flaw in a main which alters the reluctance of the metallic material between portions disposed on opposite sides of the flaw.

Figure 4:
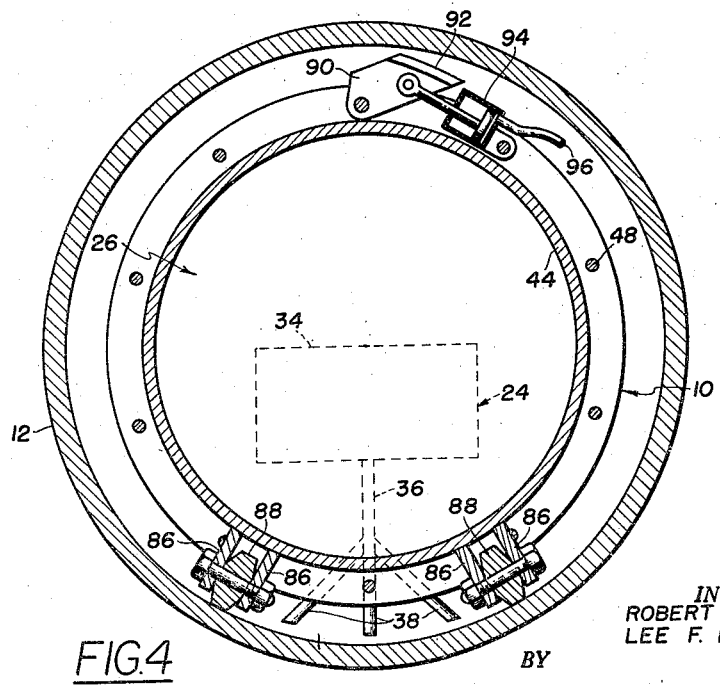
Fig. 4 is a sectional view taken on the line 4—4 of Fig. 2.
Figure 9:
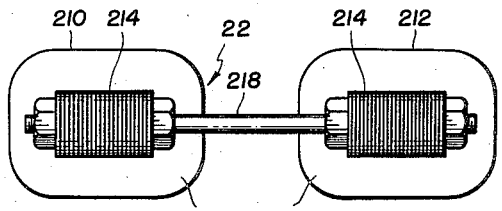
Fig. 9 is a side elevation of the joint-locating device which forms a part of the method and apparatus of this invention.

The means 24 for conditioning a detected joint is mounted on the leading end of the sealing mechanism 10, i.e., the extreme right-hand end thereof (Figs. 2, 3). The means 24 consists of an air valve 34 and a depending stem 36 having a plurality of air nozzles 38 (Fig. 4) which extend in a downward direction toward the lowermost part of the main 12. A spur line 40 and selector valve 42 connect the air valve 34 with line 18.

The sealing-agent storage 26 and cooperative extruding elements 28 are best seen in Figs. 2 and 3. The sealing-agent storage 26 consists of a cylinder 44 having transverse closure plates 46 at opposite ends thereof. A plurality of clamp bolts 48 are fastened at each end to the closure plates 46 to retain the closure plates 46 against the ends of the cylinder 44.

A piston 50 having packing 52 is slidably received in the cylinder 44. Referring to Figs. 2 and 3, a housing 54 is fastened to the right-hand closure plate 46. A chamber 56 is formed between the housing 54 and closure plate 46.

A metering mechanism 58 is mounted in chamber 56. The metering mechanism comprises a cable drum 60 with an internal coil spring, a mounting bracket 62 for the drum 60, and a gearing 64 connecting the drum 60 to a variable resistor 66 which forms part of an electric circuit shown diagrammatically in Fig. 8.

The variable resistor 66 has in conjunction therewith an appropriate voltage source 68 (battery or the like), an ammeter 70, and conductors 72 which connect the variable resistor, ammeter, and voltage source in series.

A cable 74 which has several turns on the drum 60 is operatively fastened to the piston 50. The free end of the cable is passed through an opening 76 in the closure plate.

The chamber 56 connects with line 18 through a port 78, a short conduit segment 80 and selector valve 42. A second port 82 and a conduit 84 connect chamber 56 with applicator 30.

At the bottom of the cylinder 44 (Figs. 1, 4) there are two sets of spaced metallic lugs 86 which have mounted therebetween respective wheels 88. It will be noted from Figs. 1 and 4 that the wheels 88 are canted, with the result that the mechanism 10 tracks straight ahead in the bottom of the main 12 as it is pulled forwardly. Also, the canted position of the wheels prevents turning of the cylinder 44 as it is moved forwardly or backwardly in the main 12. In other words, the wheels 88 will not climb up the wall of the main 12, but will keep the cylinder 44 in the same angular position shown in Figs. 1 and 4 during its passage through the main 12.

At the upper side of the cylinder there are provided two (2) brakes 90 which prevent rotation of the cylinder 44 in the main during operation of the mechanism. Each brake has a friction element 92 (Fig. 4) which is pivoted on the uppermost clamp bolt. The friction element is engageable with the inner surface of the main 12, and is actuated by an air cylinder 94. The line 96 which actuates the air cylinder 94 connects with line 84 leading from chamber 56.

A tube 98 is fixedly secured to the left-hand closure plate 46 (see Figs. 2 and 3). A hollow rod 100 is fitted within the tube 98 and extends into the cylinder 44. End 102 of the rod (which extends into the cylinder) is flared to insure that sealing material which is extruded from the storage 26 can pass only through the rod 100. The rod 100 is supported on a packing 104 at the end thereof. A rotatable T-shaped nozzle 106 is used to convey sealing material from the rod 100 to the inner wall of the main 12. The shank 108 of the T-shaped nozzle 106 is carried by a packing 110, and the open ends of the nozzle 106 terminate in close proximity to the inner wall of the main 12 (Fig. 1).

The applicator 30 for spreading the sealing material is located at the trailing end of the mechanism 10. The applicator 30 is carried by the stationary tube 98. A plurality of paddles 112 (numbering four (4) in the example shown) are provided with rubber blades 114 which are curved along the edge which engages the inner surface of the main. Each paddle has a mounting segment 116 which consists of two spaced apart lugs 118 having aligned openings 120 which receive a pin 122 pivotally connecting the paddle to a rotatable hub 124. The hub 124 is mounted on tube through spaced-apart anti-friction bearings 126 (Figs. 2 and 3).

The necessary rotary movement for the paddles is furnished by an air motor 128 having a sprocket wheel 130. A second sprocket wheel 132 of suitable size in relation to sprocket wheel 130 is connected to the hub 124. A chain 134 drivably interconnects the two sprocket wheels 130 and 132.

It is necessary that a part of the applicator be reciprocable in order to spread the blades of the paddles 112 into yieldable contact with the inner surface of the main 12. The part of the applicator that undergoes this recriprocable movement consists of a first frame ring 136, a second frame ring 138, frame rods 140 which are welded or otherwise fastened to the frame rings 136 and 138, bearings 142, and collar 144. Ends 146 of the frame rods extend through openings 148 in the hub 124 and are reciprocable therein. The frame rings 136 and 138 and the frame rods 140 are rotatably driven by the hub as well as being longitudinally reciprocable.

A fixed collar 150 is provided on the tube 98; a compression spring 152 is located between collar 150 and one of the bearings 142. The spring holds the reciprocable components of the applicator in a position such that the paddles 112 are kept in a normally retracted position (Fig. 2).

An air cylinder 154 is used to effect the necessary longitudinal movement on the frame rods 140 and frame rings 136, 138, which lateral movement is used to protract the paddles 112.

The air cylinder 154 and the air motor 128 are serviced by a pressure source consisting of an elongated pressure chamber 156 which connects with pressure chamber 56 through conduit 84.

For protracting or spreading the paddles 112 a heavy spring 158 is fastened between each of the paddles 112 and the frame ring 136. The locations of the fastening of the springs between the paddles and frame ring is such that tensioning of the springs (produced by relative movement between the ring and paddles) causes pivoting of the paddles about the pins 122, thus bringing the blades 114 into yieldable contact with the inner wall of the main. Four additional springs 160 are fastened between adjacent paddles to keep the paddles in a normally retracted position shown in Fig. 2.

It will be noted from Fig. 1 that the T-shaped nozzle 106 is received between a bifurcated portion 162 of two (2) of the pins 122 which pivotably mount two (2) of the paddles. This connection between the pins 122 and nozzle 106 causes turning of the nozzle and insures that sealing material will be distributed around the entire inner surface of the main.

The operation of the mechanism will next be considered.

The mechanism 10 is fitted into the main 12 by cutting the main to make an opening at the excavation 14. The line 18 is then push-fed from a second opening in the main which is formed at the excavation 16.

The line 18 is attached to the mechanism 10 and is used to pull the mechanism through the main, toward the right, looking at Fig. 5.

The mechanism 10 is advanced toward the right until the joint locating device 22 detects a joint in the main.

The mechanism 10 is stopped when a joint in the pipe is detected. The means 24 or conditioning device is then operated (if it is located sufficiently close to the joint locating device), or the mechanism can be pulled forwardly enough so that the air nozzles 38 overlie the detected joint.

The selector valve 42 is operated so that chamber 56 is cut off from line 18. Pressure is then transferred through spur line 40 to air valve 34. Compressed air is then released through the nozzles 38 and directed against the joint at the bottom of the main where foreign matter is liable to collect. The stream of compressed air which is shot through the nozzles cleans the joint of any loose material and this prepares it for sealing.

The mechanism 10 is located in the position shown in Fig. 2 during the joint-detecting stage.

The distance from the joint-detecting part of the mechanism (detector 22) to the applicator portion is a matter of design. The operator having this information takes up sufficient of the line 18 to position the mechanism 10 as shown in Fig. 3 with the paddles in registry with the detected joint. The mechanism is now prepared for the sealing step.

The selector valve 42 is operated so that connection of the line 18 with the air valve 34 is severed, and the line 18 is then connected with the conduit segment 80 leading to chamber 56.

Air pressure is then communicated to chamber 56 and the piston is forced toward the left (Fig. 3), displacing sealing material from the cylinder 44 through the hollow rod 100. Sealing material, which preferably consists of plastic material which polymerizes under atmospheric conditions, is then forced through the nozzle 106 and exudes from the open ends onto the inner surface of the main in the vicinity of the joint to be repaired.

As the piston moves toward the left in Fig. 3, the cable 74 is pulled off the drum 60, rotating the drum and operating the variable resistor 66. The variable resistor 66 is designed to give a reading on the ground surface which indicates the amount of piston travel, this piston travel being a measure of the quantity of sealing material which has been extruded. Based on this reading, the operator can terminate the sealing operation when the required amount of sealing material has been expelled from storage to repair the joint.

The applicator 30 then rotates to spread the extruded material about the interior of the main. Pressure in cylinder 56 is transmitted to chamber 156 via line 84. The pressure in chamber 156 operates the air cylinder 154, causing movement of the collar 144, bearings 142, frame rings 138, 136 and rods 140 toward the right against the resistance of spring 152. The components are shown in released position in Fig. 2; Fig. 3 shows the location of applicator parts after the air cylinder has been operated. As a result of air cylinder 154 operation, the paddles 112 are moved out into engagement with the interior surface of the main. When the ring 136 is moved toward the right (Figs. 2 and 3) the springs 158 are tensioned, thus exerting a force on each paddle 112. This spring force is located in relation to the pivot mounting of the paddle so that the paddle is caused to pivot on the pin 122 and thus move radially outwardly into engagement with the main. The rubber blades 114 then scrape and spread the extruded sealing agent over the area of the main having a joint. It will be noted from Fig. 6 that the blade is slightly curved. The reason for this design is that a uniform layer of sealing agent is obtained which is spread over the surface of the main and pressed into the joint.

Rotation of the paddles is effected by the air motor 128, air being supplied from chamber 156 to operate the motor 128.

The air motor 128 acts through a sprocket wheel 130 and chain 134 to rotate sprocket wheel 132. The hub 124 is operatively connected to the sprocket wheel 132 and thus the hub 124 is rotatably driven by the air motor. When the hub turns, this motion is imparted to the paddles 112 and blades 114, thus spreading the sealing agent over the inner surface of the main.

When operation of the mechanism is terminated, the pressure in chambers 56 and 156 is reduced and the springs 160 thereafter pivot the paddles 112, retracting the blades 114 from the inner surface of the main.

It will be noted that each of the springs 160 is fastened at both ends to the paddles. At one end the spring nearly overlies the pivot point of the paddle and hence exerts little tendency to turn the paddle; at the other end, however, the point of attachment of the spring on the paddle is considerably removed from the pivot point of the paddle and is therefore adequately capable of exerting appreciable retracting force on the paddle. These features are best seen in Fig. 1.

After the paddles are retracted, the mechanism can then be further advanced along the length of the main until a succeeding joint is detected, whereupon the sealing operation is repeated.

Of major importance in accordance with the teachings of this invention is the fact that an existing gas main may be completely reconditioned from the interior thereof which is completely inaccessible to human hands. As explained in the preamble, in resealing joints, such as joint 226 of Fig. 12, it was necessary to sink or dig an opening through the ground which revealed the joint completely, after which a sealing material was encased about the joint. Thus, if the sections of pipe 12 were only ten feet long, a suitable opening would have to be dug every ten feet in order to reach each joint. With this invention, it is possible to condition a plurality of pipe joints 226 by the digging of only two holes. These holes are illustrated in Fig. 5 by the reference numerals 14 and 16 respectively. The steps of (1) detecting a joint, (2) sealing that same joint, and (3) moving and detecting the next succeeding joint are all performed interiorly of the main 12. Thus, the steps of (1) detecting and (2) of sealing performed in logical sequence interiorly of a main and invisible to the operators are performed accurately and reliably, and in addition obviously more expeditiously. Being able to recondition the interior of a gas main by the method and apparatus of this invention, a great savings in cost is made possible, and when a stretch of main fifty miles long, for example, is reconditioned, the actual savings totals many thousands of dollars. The reason why this great savings is achieved resides mainly in the fact that all of the operations necessary for reconditioning are performed interiorly of the pipe without need of specific manual attention. An operator positioned at a single station may be responsible for sealing a large number of joints and cracks, whereas previously a crew of many men was required to recondition even a single joint.

It will be appreciated that all of the operations of the mechanism are remotely controlled at the ground surface. The operator can regulate the sealing operation from a point far removed from the actual location of the sealing mechanism.

The word "joint" as used hereafter in the claims is intended to include all pipe joints, cracks, crevices, flaws, fissures or the like which resemble, in a magnetic circle, said pipe joints, whereby the joint-locating device 22 can provide an indication of the same.

It will be understood that numerous applications of this invention can be made by varying specific details shown here. It is my intention to include within the scope of the claims all such variations and revisions as are within the spirit and principle of the invention.

What is claimed is:

1. Mechanism of the character described comprising electrical means for locating abutting ends of adjacent pipe sections from the interior of said pipeline, storage means structurally associated with said electrical means for holding a quantity of sealing material and movable in the pipeline, material-applying means movable in the pipeline and having a supply connection with said storage means whereby a quantity of sealing material may be applied to a localized area of the interior of the pipeline, means operatively associated with said storage means and said applying means for effecting application of a predetermined measured quantity of said material to said located section ends, and means for moving said locating means and said material-applying means, in correlative position, in the pipeline whereby said abutting ends may first be located and said material-applying means then positioned in registry therewith for applying sealing material thereto.

2. Apparatus for sealing pipe lines comprising an electrical device for detecting the exact location of a separation of pipe material in a pipe line from the interior of the pipe line, individual sealing mechanism for applying a fluid sealing material to a pipe joint, means for moving said device and said mechanism through said line, and means securing said device and said mechanism in fixed relative position with respect to each other such that location of a joint by said device serves as an indication of the position of said mechanism relative to the last-mentioned joint.

3. The method of coating underground pipeline joints comprising the steps of making an excavation to the pipeline, forming an opening in the pipeline, introducing a joint-locating and coating apparatus through said opening into the pipeline interior, moving said apparatus from said excavation through said pipeline and locating from said excavation a joint remote from said excavation, and coating said joint immediately following the location thereof with a predetermined measured quantity of sealing material.

4. The method of coating underground pipeline joints comprising the steps of making two excavations, spaced a predetermined distance apart and spanning a plurality of joints, to the pipeline to be serviced, making two openings in the pipeline in registry with said two excavations respectively, introducing a joint-locating and sealing apparatus through one opening into the pipeline, moving said apparatus through said pipeline from one of said excavations, alternately locating and locally coating each joint as it is traversed by said apparatus under control from said one excavation, and removing said apparatus from said other pipeline opening.

5. The method of coating a plurality of underground pipeline joints in a single series of common steps comprising the steps of locating in sequence a plurality of joints in an underground pipeline from an operator position external of the pipeline, applying a predetermined measured quantity of coating material to each joint immediately following its location, and repeating these steps of locating joints and applying material until a number of joints are coated.

6. The method of coating underground pipeline joints comprising the steps of making an excavation to the pipeline, forming an opening in the pipeline, introducing a joint-locating and sealing apparatus through said opening into the pipeline interior, moving said apparatus from said excavation through said pipeline and sequentially locating from said excavation joints remote from said excavation, discharging a predetermined measured quantity of coating material onto each joint immediately after its location, and spreading the discharged material onto each located jointed to provide a coating thereon.

7. Apparatus for locally conditioning joints in a pipeline comprising a joint-coating device for applying a coating of sealing material to the interior surface of a pipe joint, and an electrical locating device operatively connected to said joint-coating device at a point fixedly spaced from said mechanism for locating the abutting ends of adjacent pipe sections from the interior of said sections, and transporting mechanism for moving said joint-coating device and said locating device together as a unit through the interior of a pipeline for first locating and then coating a joint in the pipeline.

8. Apparatus for locally conditioning joints in a pipeline comprising joint-coating mechanism having front and rear portions, a storage means for coating material operatively secured to the front portion of said joint-coating mechanism, a metering device for conducting a predetermined measured quantity of coating material from said storage means to said joint-coating mechanism, an electrical joint-locating device operatively secured to said joint-coating mechanism a fixed distance to the front thereof, and transporting means for moving the complete apparatus unidirectionally through a pipeline whereby alternately a joint may be located and then coated locally with said measured quantity of material.

9. Apparatus for locally conditioning joints in a pipeline comprising joint-coating mechanism having front and rear portions, a storage means for coating material operatively secured to the front portion of said joint-coating mechanism, a metering device for conducting a predetermined quantity of coating material from said storage means to said joint-coating mechanism, an indicating device operatively connected to said metering device for providing an indication of the quantity of material actually metered, a joint-locating device operatively secured to said joint-coating mechanism a fixed distance to the front thereof, and transporting means for moving the complete apparatus unidirectionally through a pipeline for alternately locating a joint and then coating a joint locally with coating material.

10. Apparatus for locally conditioning joints in a pipeline comprising a transporting carriage, a storage means for plastic material on said carriage, a dispenser operatively connected to said storage means for dispensing material therefrom, an indicating device operatively connected to said dispenser for indicating the amount of material dispensed thereby, a coating applicator operatively supported by said carriage, conduit means for supplying a quantity of dispensed material from said storage means to said applicator, and a joint-locating device operatively supported for movement by said carriage, said joint-locating device being disposed in fixed relationship with respect to said applicator.

11. The apparatus of claim 10 wherein said dispenser is a piston in said storage means.

12. The apparatus of claim 11 wherein said indicating device is connected directly to said piston and comprises a voltage-changing element which effects a change in voltage indication upon movement of said piston.

13. Apparatus for locally conditioning joints in a pipeline comprising a transporting carriage, a cylinder mounted on said carriage for transporting movement, a piston reciprocably received by said cylinder, an electrical indicator operatively connected to said piston for registering the degree of movement thereof, a supporting post coaxially extending from one end of said cylinder, an applicator rotatably mounted on said post, a conduit extending from the interior of said cylinder to said applicator whereby material may be conducted from said cylinder to said applicator, a rotary nozzle coupled to said conduit for delivering material to said applicator, and joint-locating means operatively carried by said carriage a fixed distance from said applicator.

14. Apparatus for locally conditioning joints in a pipeline comprising a transporting carriage, a cylinder mounted on said carriage for transporting movement, a piston reciprocably received by said cylinder, an electrical indicator operatively connected to said piston for registering the degree of movement thereof, a supporting post coaxially extending from one end of said cylinder, an applicator rotatably mounted on said post, a retracting device interconnecting said applicator and said post and selectively operable to protract and retract said applicator, a conduit extending from the interior of said cylinder to said applicator whereby material may be conducted from said cylinder to said applicator, a rotary nozzle coupled to said conduit for delivering material to said applicator, and joint-locating means operatively carried by said carriage a fixed distance from said applicator.

15. The method of coating the joints of an underground pipeline made up of successive jointed sections of pipe comprising the steps of excavating to the pipeline, forming an opening in the pipeline, introducing coating apparatus and electrical joint-locating apparatus through said opening into the pipeline, moving said apparatuses through said pipeline and utilizing said electrical joint-locating apparatus to indicate at said opening the location of a joint remote from said opening, moving said coating apparatus into registry with said located joint, and applying a predetermined measured amount of covering coating to a localized area at said joint, the movement of said joint-locating and coating apparatus and the application of said coating being controlled from said opening.

References Cited in the file of this patent

UNITED STATES PATENTS

| | | |
|---|---|---|
| 1,736,293 | Van Denberg | Nov. 19, 1929 |
| 1,933,547 | Drake et al. | Nov. 7, 1933 |
| 1,988,329 | Perkins | Jan. 15, 1935 |
| 2,017,042 | Dougherty | Oct. 15, 1935 |
| 2,133,013 | Boylan | Oct. 11, 1938 |
| 2,133,035 | Boylan et al. | Oct. 11, 1938 |
| 2,743,743 | Galloup | May 1, 1956 |

FOREIGN PATENTS

| | | |
|---|---|---|
| 142,419 | Great Britain | May 6, 1920 |
| 646,400 | Great Britain | Nov. 22, 1950 |